United States Patent [19]
Curtindale et al.

[11] Patent Number: 6,000,959
[45] Date of Patent: *Dec. 14, 1999

[54] DOOR PANEL WIRING SYSTEM

[75] Inventors: Edward G. Curtindale, Farmington Hills; Steve Gawron, Detroit; Alexander Zaguskin, Farmington Hills; Brent Kuhn, Novi, all of Mich.

[73] Assignee: Lear Corporation, Southfield, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/599,096

[22] Filed: Feb. 7, 1996

[51] Int. Cl.$^6$ .................................................. H01R 13/64
[52] U.S. Cl. ........................................... 439/247; 439/246
[58] Field of Search ..................... 439/246, 247, 439/248; 49/502; 174/72 A, 65 R; 276/39.1; 296/146, 152; 361/826

[56] References Cited

U.S. PATENT DOCUMENTS

| | | | |
|---|---|---|---|
| 4,771,743 | 9/1988 | McDowell | 174/72 A |
| 4,815,984 | 3/1989 | Sugiyama et al. | 439/211 |
| 4,824,164 | 4/1989 | Nakayama et al. | 296/146 |
| 4,848,829 | 7/1989 | Kidd | 296/152 |
| 4,882,842 | 11/1989 | Basson et al. | 29/857 |
| 4,907,836 | 3/1990 | Ueda et al. . | |
| 4,909,748 | 3/1990 | Kozono et al. | 439/247 |
| 4,915,641 | 4/1990 | Miskin et al. | 439/247 |
| 4,921,435 | 5/1990 | Kane et al. | 439/248 |
| 4,942,499 | 7/1990 | Shibata et al. | 439/247 |
| 5,092,647 | 3/1992 | Ueda et al. . | |
| 5,251,403 | 10/1993 | Compeau et al. . | |
| 5,367,832 | 11/1994 | Compeau et al. . | |
| 5,385,481 | 1/1995 | Kotyuk . | |
| 5,425,206 | 6/1995 | Compeau et al. . | |

FOREIGN PATENT DOCUMENTS

| | | |
|---|---|---|
| 0686520 | 5/1995 | European Pat. Off. . |
| 0694426 | 1/1996 | European Pat. Off. . |
| 2569146 | of 0000 | France . |
| 3804086 | 8/1988 | Germany . |

OTHER PUBLICATIONS

"Next–generation modular door system", Automotive Engineering, by: Kevin Jost, May 1995.

PCT Patent Application, Publication No. WO 89/1171, Application No. PCT/US89/01926, Filing Date May 5, 1989, Title: Vehicular Modular Door Panel Assembly with Laterally Extended Electrical Contact Interfacing.

Primary Examiner—Michael L. Gellner
Assistant Examiner—Antoine Ngandjui
Attorney, Agent, or Firm—Brooks & Kushman PC

[57] ABSTRACT

An improved wiring system for vehicle doors allows the trim panel to be simply snapped to the metal door frame. Electrical connections are made by floating electrical connectors at the time the two are snapped together. Alignment pins on the floating connector are received within corresponding openings in the second connector to facilitate alignment. In other features, a water barrier may include electric wire holding structure such that the wires may be merely mounted to the water barrier, without the necessity of any complex wire harness. In other aspects of this invention, a plurality of electrical components may be connected through a single electrical connector.

21 Claims, 4 Drawing Sheets

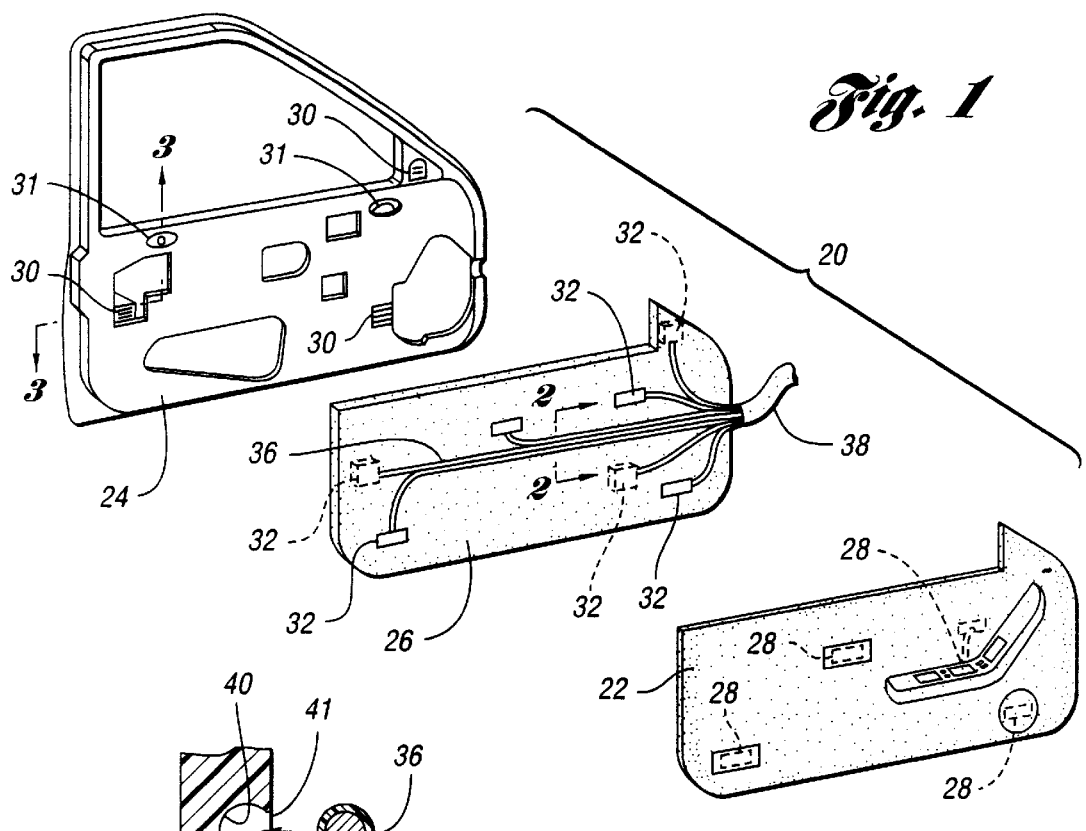
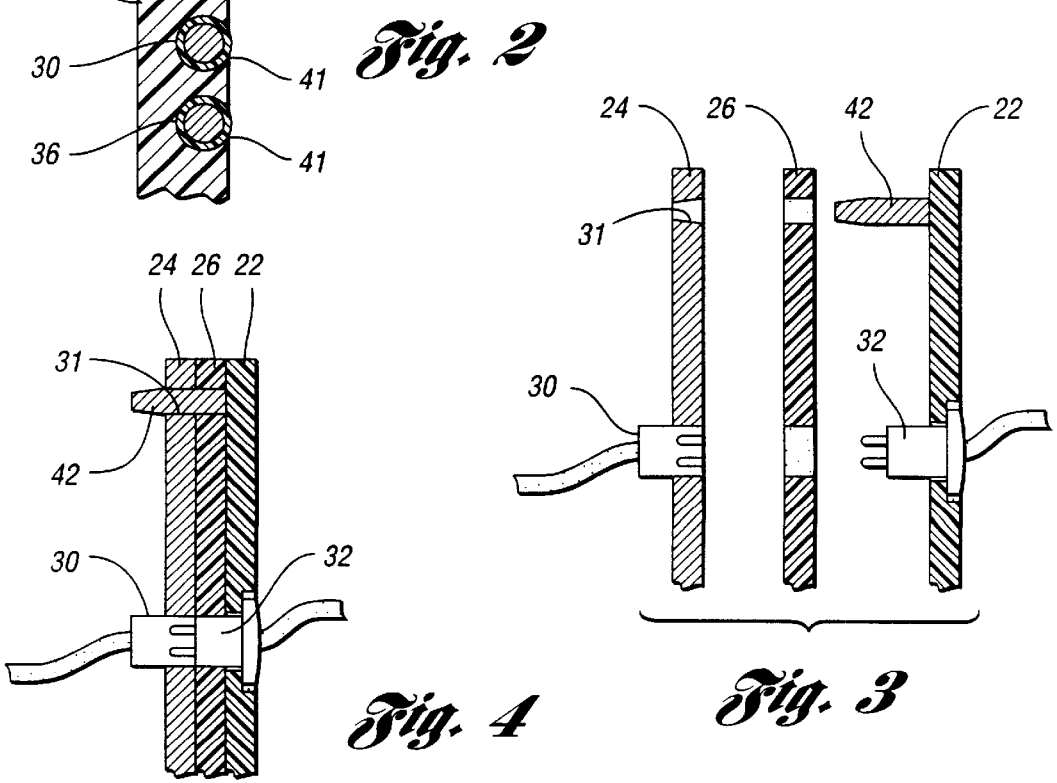

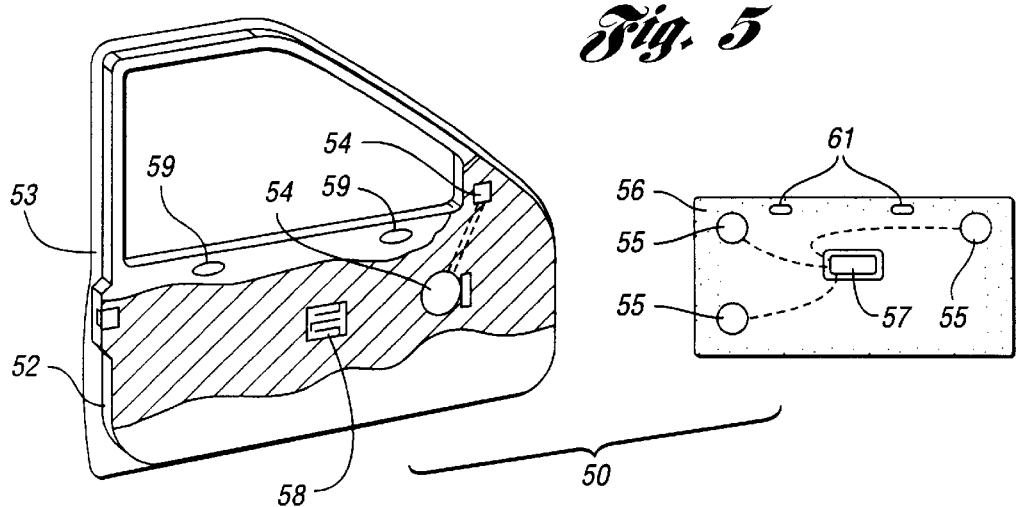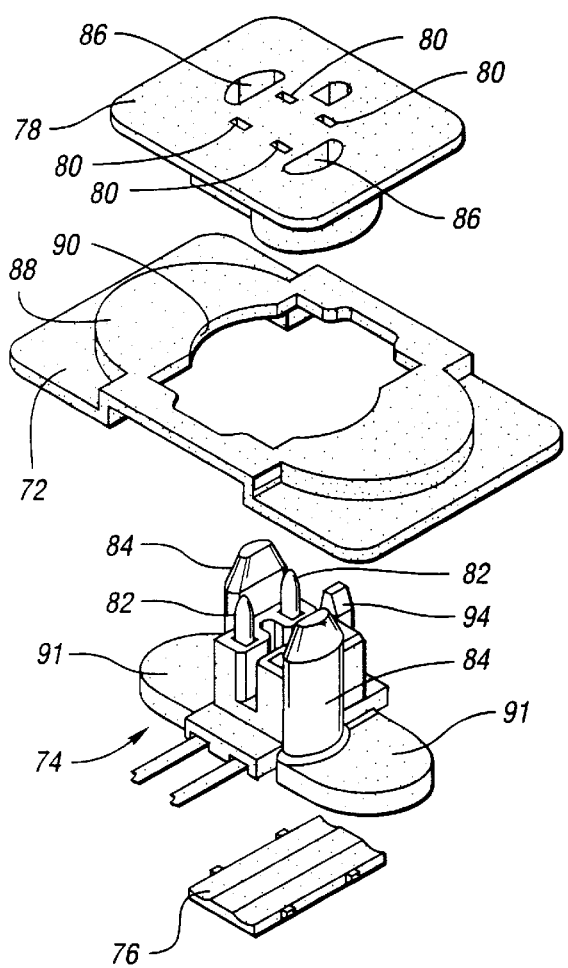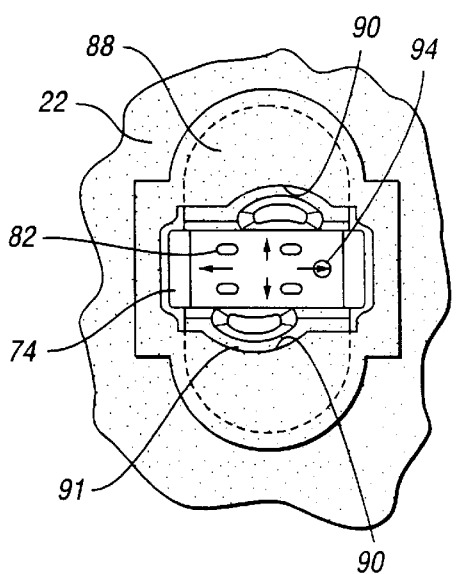

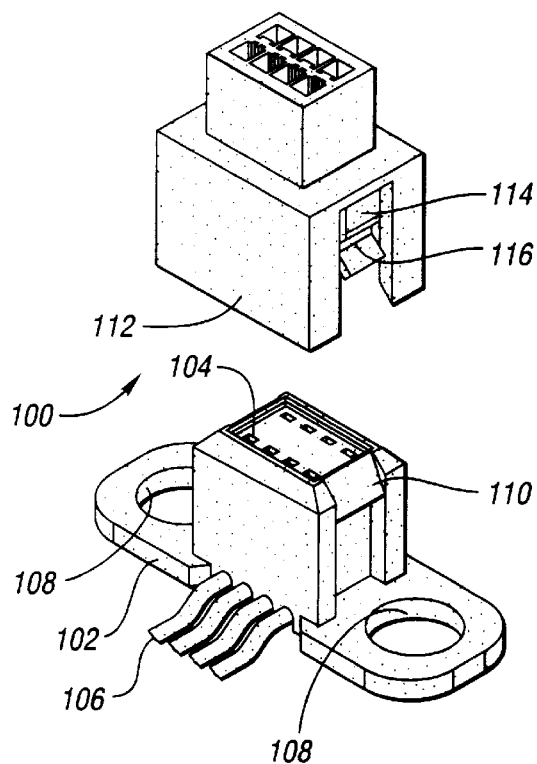
*Fig. 9A*
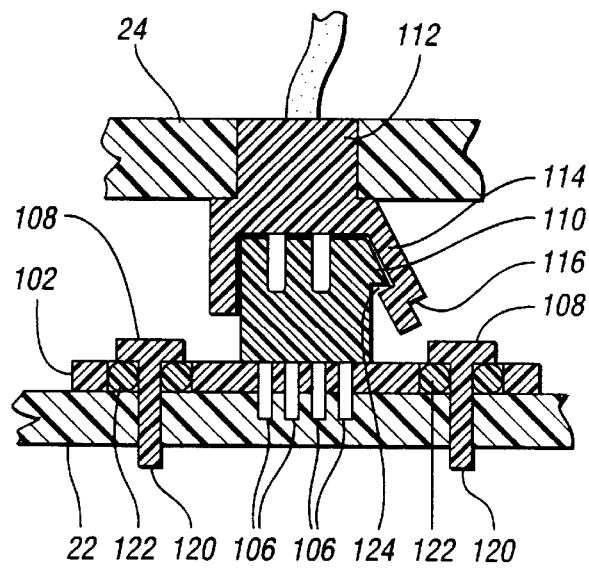
*Fig. 9B*
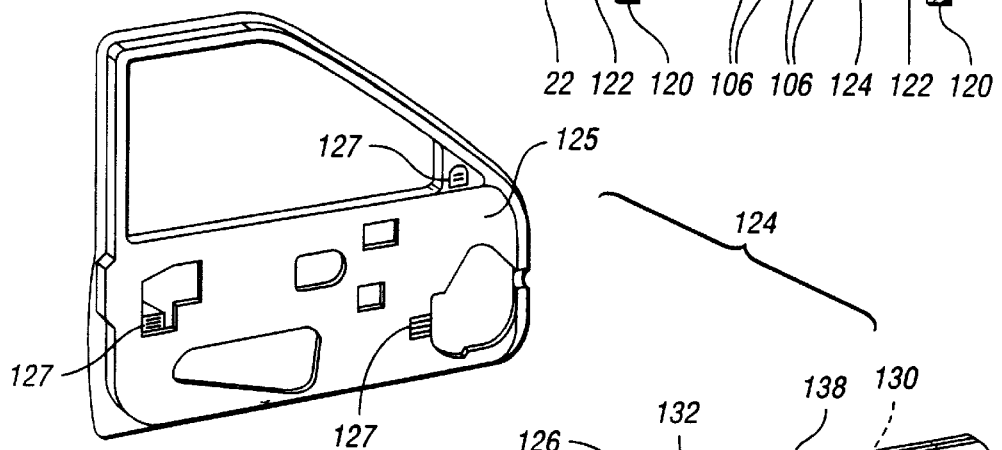
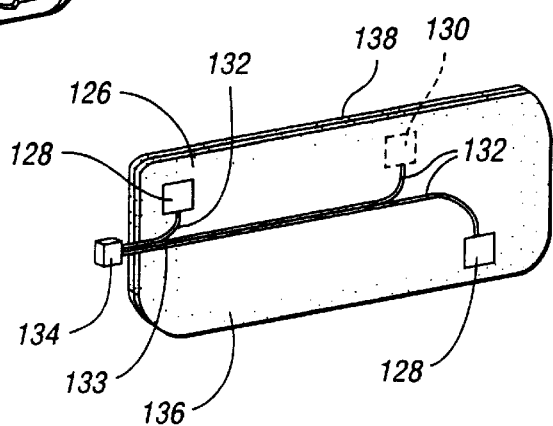
*Fig. 10*

DOOR PANEL WIRING SYSTEM

BACKGROUND OF THE INVENTION

This invention relates to improvements in vehicle door wiring systems.

Vehicle doors typically include a metal door frame and an interior trim panel attached to the door frame. A water and/or sound barrier is typically attached to either the door or trim panel, and sandwiched between the two. A wire harness is attached to either the door frame or the trim panel, and communicates electrical connections between components on the door, the trim panel, and also to controls and accessories remote from the door. In the prior art, an assembler has typically been required to complete the electrical connections between the door and its wire harness, or alternatively, between the wire harness and the trim panel, as the trim panel is moved to be mounted to the door frame. The door frame and trim panel must be relatively closely spaced to complete the electrical connections, and the worker must reach into the narrow space between the door frame and trim panel to make the connections. This is cumbersome, and inconvenient. Examples of the types of door structure and electrical connections that are utilized are shown in U.S. Pat. No. 4,882,842.

As more electrical components are mounted into the door, the assembly becomes even more inconvenient. In addition, the wire harnesses have become correspondingly complex and difficult to manufacture and assemble.

Systems have been proposed wherein plug-in electrical connections are completed as the trim panel is moved towards the door. While this would be beneficial in theory, the proposed systems have required exact alignment between the two electrical connectors, which is difficult to achieve. Thus, these systems have not proven practically successful.

SUMMARY OF THE INVENTION

In a disclosed embodiment of this invention, electrical connections are made between trim panel electrical connectors, and mating electrical connectors on the door frame. One of the two connectors "floats", or is allowed to move along two dimensions as its aligns with the mating electrical connector. Thus, should there be some misalignment between the two electrical connectors, the misalignment is easily corrected by the floating electrical connector. The floating electrical connector adjusts such that it is plugged into the other electrical connector, completing the electrical connection. In addition, the connectors are capable of "floating" into and out of the plane of the door, or in a cross-vehicle direction. This allows the electrical connection to adjust to dynamic motion of the connectors due to door slamming, etc.

In a further preferred embodiment of this invention, the barrier mounted between the door and trim panel incorporates holding structure that holds the electrical wires, replacing the prior art wire harnesses. In a most preferred embodiment of this invention, the barrier is attached to the trim panel with the wires carried on the barrier. Electric connections between components mounted in the trim panel and the wires carried on the barrier are made before the barrier is attached to the trim panel. The trim panel and barrier subassembly is then moved towards the metal door frame. Elongate alignment pins from the trim panel subassembly are fed into openings in the door frame, to assure that the two are roughly aligned. Once the alignment pins have moved into the openings in the door frame, the trim panel is moved closer to the door frame, and the electrical connectors mate. If any of the electrical connectors are misaligned, the floating electrical connector adjusts to ensure proper alignment and an easy electrical connection.

In one embodiment of this invention, several electrical connections are made through a single connector. A mounting panel is first attached to the metal door frame. All electric wires are carried in the panel and a single connector communicates all signals to the trim panel. The trim panel has a single connector that is electrically connected to several components on the trim panel. The trim panel is connected to the mounting panel. The single connection completes the electrical connections of all components on the trim panel. Again, a floating connector is preferably utilized. Wires extend from the single connector to components or controls remote from the door. Alternatively, the single connection could be made with components on the door frame.

In other embodiments of this invention, the wires running along the door or trim panel are replaced by electrical traces formed on a flexible circuit board. In addition, in one preferred embodiment, a door trim panel sub-assembly includes the trim panel itself, the water and/or acoustic barrier, a wire harness mounted to the trim panel, and electrical connections extending through the barrier to be connected to the door frame. The wire connections are preferably of the type wherein one of the two connector members is able to "float." In a most preferred embodiment the floating connector is mounted to the trim panel sub-assembly.

In further features of this assembly, floating connectors are disclosed. In one disclosed system, a mount for a first connector has a central opening that is somewhat larger than the body of the first connector. This allows the first connector to adjust or "float" in the opening. The first connector has at least one dimension that is larger than the opening, and a connection portion that extends through the opening. The larger dimension portion is received on the other side of the opening. The larger dimension portion prevents the first connector from moving through the opening. The mount is fixed in either the door frame or trim panel, and the first connector extends outwardly through the mount. Alignment structure on the first connector initially is aligned with the second connector portion to bring the two into rough alignment. The alignment structure preferably includes a pin with a tapered forward portion. The pin moves into a corresponding opening in the second connector. The first connector is adjusted within the opening in its mount as the pin moves into the opening such that the two connectors are easily brought together to provide an electrical connection.

In a second embodiment connector, the female connector includes pin openings that are connected to the trim panel by pins. The pins have an outer diameter which is much smaller than the pin openings. Resilient cushions are placed in the openings, and the pins extends through openings in the cushions. The cushions allows the connector to adjust its position on the pins to provide the alignment as described above. The male connector preferably has a latch member that rides on a ramp structure provided on the female connector. The ramp structure serves as alignment structure to ensure that the two connectors are being aligned as they are brought together. If the female structure needs to move to provide the alignment, the cushion member is compressed by the female connector moving relative to the pin. In this embodiment, once fully connected the latch member allows movement into and out of the plane of the door as described with the above referenced embodiment.

These and other features of the present invention will be best understood from the following specification and drawings, of which the following is a brief description.

BRIEF DESCRIPTION OF THE DRAWINGS

FIG. 1 is an exploded view of a door panel wiring system.

FIG. 2 is a cross-sectional view along line 2—2 as shown in FIG. 1.

FIG. 3 is a schematic view showing the three portions of the door panel assembly shown in FIG. 1.

FIG. 4 shows the three portions shown in FIG. 3 assembled together.

FIG. 5 shows an alternative door panel system.

FIG. 7A shows a first embodiment floating electric connector.

FIG. 7B shows one end face of a second electric connector.

FIG. 8A shows a view of a first connector of the FIG. 7 embodiment.

FIG. 9A shows a second embodiment connector.

FIG. 9B shows the second embodiment connector fully connected.

FIG. 10 shows another embodiment of the inventive trim panel invention.

DETAILED DESCRIPTION OF PREFERRED EMBODIMENTS

Figure 6:
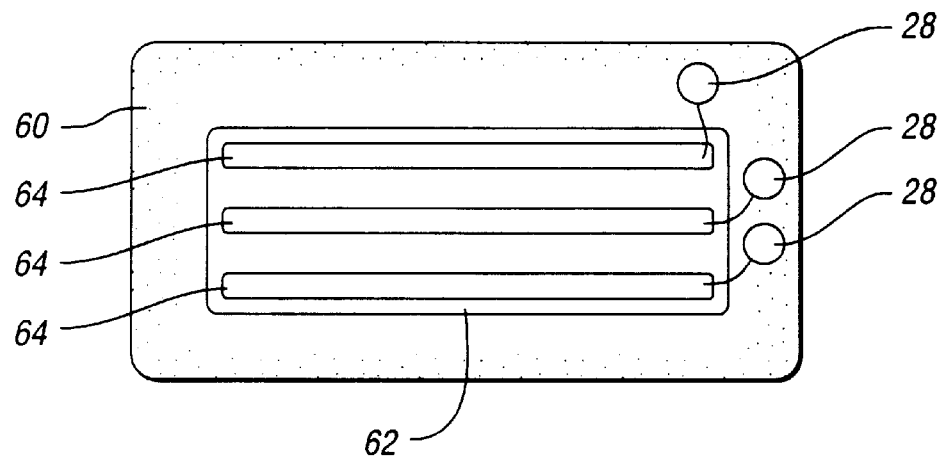
FIG. 6 shows an alternative wiring system.

FIG. 1 shows a vehicle door panel wiring system 20. A door trim panel 22 is to be attached to a metal door frame 24. A water and/or sound barrier 26 is incorporated between the trim panel 22 and the door frame 24. Electric components 28, such as switches, speakers, lights, etc. are mounted in the trim panel. Other electric components are mounted in the door frame. As an example, window motors, mirror motors, etc., are received in the door frame. The electric components mounted in the door frame are provided with connector portions 30, shown schematically, which are fixed to the door frame at set locations. The connectors 30 may be formed directly on the components, or may be connected via wires to the components. Alternatively, connectors 32 may be received in panel 22, as show in FIG. 3. Note that panel 22 is shown as a thin panel, although it is more accurately shaped as shown in the above referenced patent. The details of the electric components and circuitry form no portion of this invention and are as known in the art.

The water barrier 36 carries electric wires to connect the components on the door frame, the door panel, and to also send wires to and from electric components and controls mounted remote from the door. Electric connectors 32 are mounted within the water barrier 26. In one preferred embodiment, connections 32 are first made to the components 28 on the trim panel 22, and the water barrier 26 is then mounted to the trim panel 22. The trim panel and water barrier may then be attached to the door frame. As the parts are brought together, electrical connectors 32 on the water barrier 26 are moved into engagement with the connectors 30, completing all electric connections. In fact, connectors 32 may be mounted in the trim panel 22 and extend through the barrier 26. As will be explained below, the connections 32 and 30 include at least one floating connector such that the connections are all easily and properly made. As also shown, a plurality of wires 36 are mounted on the water barrier 26, and connected through a bundle 38 to the remainder of the vehicle. Also shown in door frame 22 are alignment openings 31, which will be disclosed in greater detail below.

FIG. 2 shows a first feature of the present invention. Water barrier 26 is formed with a plurality of wire openings 40. Wires 36 snap into openings 40. As shown, an entrance 41 into opening 40 is smaller than the outer diameter of the wire 36, such that the wire 36 must snap into the opening 40. Several openings 40 may be spaced along the length of the water barrier 26, or the opening 40 may be formed as elongated channels. Since the water barrier 26 carries the wires, a complex wiring harness is not necessary. This feature may be used independently from the separate "floating" connector invention. The barrier 26 is formed of known water barrier materials, and the material forms no portion of this invention. In other embodiments, the wires may be molded in, or sandwiched between, barrier material. Other barriers, such as a sound barrier, may also carry the wires.

FIG. 3 shows the connection of the trim panel 22 and water barrier 26 subassembly to the door frame 24. As shown, the connectors 32 and 30 are to be connected together. In this Figure, the connections are shown schematically. As also shown, an alignment pin 42 extends from trim panel 22 for a distance greater than the length of the connector 32. As shown schematically, connector 32 is received in a relatively large opening such that it may float. When the trim panel 22 and water barrier 26 are brought towards the door frame 24 for connection, initially the alignment pin 42 is received in the opening 31. The opening 31 is a pierced hole in the relatively thin sheet and receives pin 42. As the trim panel 22 and water barrier 26 move closer to the door frame 24, the connection between connectors 30 and 32 is made.

As shown in FIG. 4, the alignment pin 42 has extended through opening 31, and the connection between connectors 30 and 32 has been made. The FIGS. 3 and 4 schematically show this alignment structure.

In one method of completing assembly of a vehicle door, wires 36 are mounted into the water barrier 26. Connections between the water barrier 26 and the trim panel 22 are made by connecting connectors 32 to the components 28 in the trim panel 22. The water barrier 26 is then attached to the trim panel 22. The assembled trim panel and water barrier are then moved towards the door frame 24. Initially, alignment pin 42 is moved into opening 31, partially aligning the trim panel 22 relative to the door frame 24. As the trim panel 22 and water barrier 26 are moved closer to the door frame 24, the connections 32 are eventually made with the connections 30. Thus, the invention provides a plug-in trim panel that does not require cumbersome or complex assembly.

Although the specific embodiment disclosed in this invention has the water barrier initially attached to the trim panel, it should be understood that the water barrier could also be initially attached to the door frame 24, and the trim panel then plugged into the door frame and water barrier subassembly.

FIG. 5 shows a second embodiment 50 of this invention. In embodiment 50, a mounting panel 52, including floating connectors may be attached to the door frame 53. Electric connections are made by floating connectors to components 54 on the door frame. Mounting panel 52 typically receives wires, not shown, to be connected to components 55 on a trim panel 56. Such panels are know generally. It is the connector structure which is inventive in this application. A single connection 57 on the trim panel is connected to all components 55. A single connector 58 on mounting panel 52 is connected to connector 57 when the trim panel is attached to the door frame, completing all connections at once. Again, a floating connector may be used. Alignment openings 59 and pins 61 are utilized as in the prior embodiment. As in the first embodiment, the trim panel is moved towards the door frame 53, and a single connector 57 in the trim panel mates with the connection 58, completing the electric circuit.

FIG. 6 shows an alternative way of forming electric wires or traces on the trim panel. As shown, the panel 60 incorporates a flexible circuit board 62 formed with circuit traces 64. Flexible circuit board technology is known for other applications. Standard connections connect the board 62 to components.

FIG. 7A shows a first embodiment connection 70 which can be utilized to provide connections 30 and 32, 57 and 58. In the connection 70, a first connector mount 72 receives a floating connector 74. The floating connector 74 includes a wire holder 76 which snaps behind wires connected to connector 74. The second connector 78 has connections 80 that receive electrical connections 82 from the first connector 74. As shown, tapered alignment pins 84 extend upwardly into openings 86 in the second connector 78. Only the top of the openings 80 and 86 are shown in second connector 78 in FIG. 7A.

FIG. 7B shows the outer or bottom surface of the connector 78. As shown, the alignment openings 86 are larger on the outer side as shown in FIG. 7B than they are in the inner side as shown in FIG. 7A. As the alignment pins 84 move into the openings, the tapered forward end of the alignment pin 84 is centered within the inner opening 86. It is this centering which causes the adjustment of the two connectors to ensure the proper mounting. As the two more closer a centering pin 94 moves into a slot 96 in an opening 98. The connections 82 also moves into opening 98. When the two connectors are properly centered, the electrical connections 80 and 82 are fully made. Since the connector 74 can float, it is ensured that this adjustment and proper mating will occur.

As shown, mount 72 includes an upstanding portion 88 with an opening 90. A pair of shoulders 91 on connector 74 extends for a greater distance from the opening 90. The connector 74 is placed within opening 90, and the shoulders 91 ensure that the connector does not move fully through the opening 90.

Figure 8B:
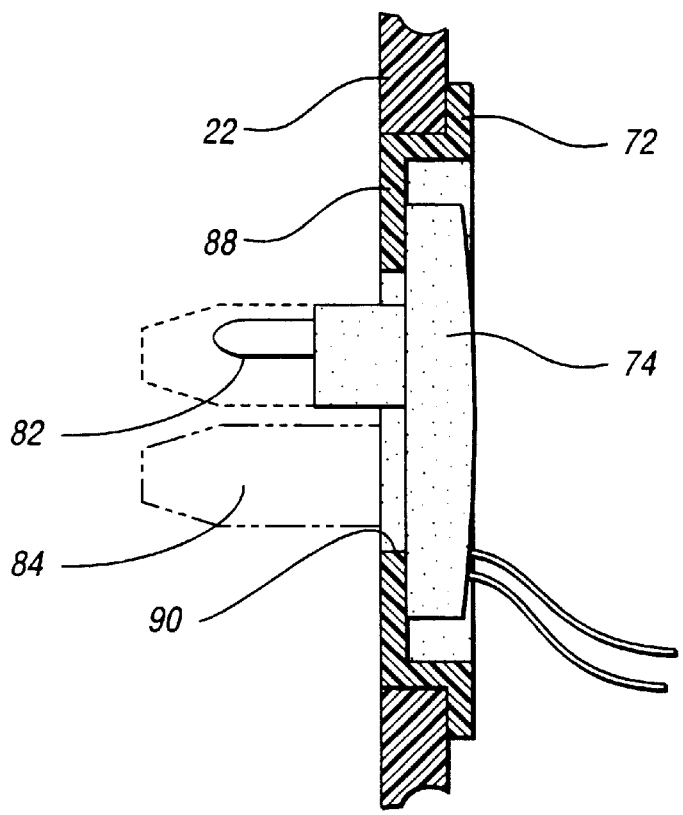
FIG. 8B shows the mounting of the connectors.

As shown in FIG. 8A, the mount 72 is mounted within one of the door members, such as the trim panel 22. Second connector 78 would then be fixed to the door frame. Alternatively, the floating connector may be used on the door frame. As shown in FIG. 8B, the connector 74 is held in the mount 72 and the panel 22. If the water barrier is also mounted in that location, it may be that the connector 74 is sandwiched between the water barrier and the mount 72. As shown in FIG. 8A, the connector 74 can move along two dimensions within the opening 90, thus allowing adjustment between the connectors as the two connectors are moved together. Note, that connector 74 can move to the right or left as shown in FIG. 8B. That is, connector 74 can also move into and out of the plane of the trim panel as necessary to maintain an electrical connection and to prevent fretting and mechanical wear due to dynamic motion of the terminals due to door slamming, etc. The amount of clearance may be exaggerated in these figures to illustrate the clearance.

As the trim panel and water barrier subassembly are brought to the door frame, the alignment pins 84 are moved into the openings 86. The alignment pin 84 is tapered near its forward end, and that tapered end is eventually received within the smaller inner end of the opening 86 as shown in FIG. 7A. As shown in FIG. 7B, the outer end of the opening 86 which initially receives the alignment pin 84 is larger. Thus, as the alignment pins 84 move further into the alignment openings 86, the alignment pin is centered within the opening 86. During this centering, the connector 74 is adjusted such that the connections 82 will be properly received within the connections 80. Thus, the alignment pins ensure proper alignment, while the floating mount of the connector 74 allows the two connectors to self-adjust to achieve the proper positioning.

FIG. 9A shows a second embodiment connection 100. This connection also allows floating in all of the directions as the above disclosed embodiment. A female connector 102 has connection portions 104. Wires 106 lead to the connections 104. A pair of pin mount openings 108 are formed on each side of the connections 104. A ramp 110 facilitates alignment as will be disclosed below.

The male connector 112 includes a ledge 114 having an inner finger 116 that will move along ramp 110 to provide alignment between the two connections.

As shown in FIG. 9B, male connection 112 is preferably fixed to a door frame 24. Female connection 102 is preferably pinned to a trim panel 22. As shown, pins 120 extend through openings 108. A cushion 122, preferably formed of a resilient rubber material surrounds the pins 120 in the openings 108.

As the trim panel 22 is brought toward door frame 24, ledge 114 and finger 116 ride along ramp 110. This provides alignment of the female member 102, since it will move as necessary to allow further movement of the ledge 114. As the female member moves into and out of the plane of 9B, or to the left and right, the openings 108 move relative to pins 120. The cushions 122 are compressed, but do allow this movement. Once the connection is fully made, the finger 116 has passed beyond the ramp 110. As shown in this Figure, however, there is some clearance 124 allowing the two connector members to move relative to each other to allow dynamic motion of the connectors as described above. In further features of this invention, the ledge 114 extends for a smaller lateral distance (into and out of the plane of FIG. 9B) than the ramp 110. This allows the female member 102 to adjust in this direction relative to the ramp as necessary to provide the fully engaged connection such as shown in FIG. 9B. It should be understood that other type connections that allow adjustment may be used.

FIG. 10 shows one last embodiment of the present invention 124. In embodiment 124, a door frame 125 is connected to a trim sub-assembly 126. Connectors 127 on the door frame 125 are connected to components as in the prior embodiments. In FIG. 10, the inventive structure is in the trim sub-assembly 126. Trim sub-assembly 126 incorporates floating connectors 128 for the connections 127 on the door frame 125. Note that there are also components 130 on the trim subassembly 126, and wires 132 lead from connectors 128 and components 130 into a wire harness 133, and eventually to a wire harness connector 134. As is known in the prior art, wire harness connector 134 will be connected to a mating connector once the trim sub-assembly 126 is fixed to the door frame 125.

In other features, the trim sub-assembly 126 incorporates an acoustic barrier 136, with the wires 132 received between the barrier 136 and an underlying trim panel 138. The connectors 128 extend through the barrier 136, and are free to float as with the above described embodiments.

Preferred embodiments of the present invention have been disclosed, however, a worker of ordinary skill in the art would recognize that certain modifications would come within the scope of this invention. For that reason, the following claims should be studied to determine the true scope and content of this invention.

We claim:

1. A vehicle door assembly wiring system comprising:
   a metal door frame;
   a generally planar trim panel;
   electrical components mounted in both said trim panel and said metal door frame; and
   electrical connections between said electrical components and electric transmission members mounted between said trim panel and said metal door frame, said electrical connections consisting of first and second electric connectors, at least one of said electrical connections being a floating electrical connection, and including said first electrical connector movable in at least two directions generally parallel to a plane of said trim panel, and said first electrical connector also being movable in a third direction generally perpendicular to the plane of said trim panel, such that said first connector can float for alignment within said second connectors.

2. A wiring system as recited in claim 1, wherein said electrical transmission members include a wire harness mounted on said trim panel.

3. A wiring system as recited in claim 1, wherein said first and second electrical connectors also being free to move relative to each other generally perpendicular to said plane.

4. A wiring system as recited in claim 1, wherein said floating connection being made between said electric transmission members and said metal door frame to communicate electric signals to said components on said metal door frame.

5. A wiring system as recited in claim 4, wherein said second electrical connector is fixed to said door frame, and said first connector is moveable in said trim panel.

6. A wiring system as recited in claim 4, wherein there is a single floating electrical connection that communicates electrical signals to a plurality of components mounted on one of said metal door frame and said trim panel.

7. A wiring system as recited in claim 1, wherein a water barrier is positioned between said trim panel and said metal door frame, and said electric transmission members being wires mounted on wire holding structure in said water barrier.

8. A wiring system as recited in claim 7, wherein said water barrier includes wire holding structure including an opening for receiving an electrical wire, said opening having an entrance that is smaller than an outer diameter of said wire such that said wire snaps through said entrance.

9. A wiring system as recited in claim 1, wherein said first electrical connector is mounted in said trim panel, and being free to move in two dimensions relative to said trim panel.

10. A wiring system as recited in claim 9, wherein a separate mount is fixed within said trim panel, said mount having a connector opening, said first connector being received in said connector opening, and said first connector being free to move along two dimensions within said connector opening.

11. A wiring system as recited in claim 9, wherein alignment structure is formed on one of said first and second electrical connectors, said alignment structure being received in corresponding alignment structure on the other of said first and second electrical connectors to assist the alignment and mating connection between said first and second electrical connectors.

12. A wiring system as recited in claim 9, wherein said first electrical connector being received in a connector opening, said connector opening being larger than a portion of said first electrical connector that is received in said connector opening to provide freedom of movement.

13. A wiring system as recited in claim 12, wherein a separate mount member is received in said trim panel and defines said connector opening.

14. A wiring system as recited in claim 9, wherein said first electrical connector includes at least two openings, and pins extending through said openings to mount said first electrical connector to said trim panel, resilient members surrounding said pins in said openings such that said connector may move relative to said pins and said trim panel to allow freedom of movement.

15. A wiring system as recited in claim 14, wherein said second connector is fixed to said door frame, and includes a ledge member that provides alignment structure as said first and second connectors are brought together.

16. A door subassembly comprising:
    a generally planar door trim panel;
    an associated water barrier;
    a plurality of electrical transmission elements;
    a plurality of electrical components mounted on said trim panel, said transmission elements being connected to said electrical components on said trim panel; and
    at least one electrical connector to be connected to a corresponding connector on a metal door frame, said at least one connector being movable relative to said trim panel in at least two dimensions in the plane of said trim panel, said at least one connector also being movable relative to said trim panel in a direction generally perpendicular to the plane of said trim panel.

17. A door subassembly as recited in claim 16, wherein there is a single moveable electrical connector for communicating a plurality of electrical transmission members to corresponding components through a single electrical connection.

18. A door subassembly as recited in claim 16, wherein said electrical transmission members are found within a wire harness mounted to said trim panel.

19. A door subassembly as recited in claim 16, wherein said trim panel includes a connector opening, said at least one connector being received in said connector opening, said connector opening being larger than a portion of said at least one connector such that said at least one connector is free to move in two dimensions within said connector opening.

20. A door subassembly as recited in claim 19, wherein a separate mount member is received in said trim panel and defines said connector opening, said one connector being movable within said opening.

21. A door subassembly as recited in claim 19, wherein said at least one connector includes at least two openings, and pins extending through said openings to mount said connector to said trim panel, resilient members surrounding said pins in said openings such that said connector may move relative to said pins and said trim panel to allow freedom of movement.

* * * * *